(12) United States Patent
Gallagher et al.

(10) Patent No.: US 6,728,003 B1
(45) Date of Patent: Apr. 27, 2004

(54) METHOD OF COMPENSATING FOR MTF IN A DIGITAL IMAGE CHANNEL

(75) Inventors: Andrew Gallagher, Rochester, NY (US); Robert J. Parada, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/543,082

(22) Filed: Apr. 4, 2000

(51) Int. Cl.[7] .............................. H04N 1/409; G06T 5/00
(52) U.S. Cl. ........................ 358/1.9; 358/3.26; 382/260
(58) Field of Search ................................. 358/1.9, 3.27, 358/3.26, 504, 519, 406, 447, 448, 463; 382/260, 254

(56) References Cited

U.S. PATENT DOCUMENTS

| | | | |
|---|---|---|---|
| 4,060,328 A | * 11/1977 | Flynt | 356/124 |
| 4,517,607 A | 5/1985 | Ohkouchi et al. | |
| 4,597,657 A | 7/1986 | Wakabayashi | |
| 4,817,181 A | 3/1989 | Kamiya | |
| 4,969,051 A | * 11/1990 | Sasaki | 358/447 |
| 5,144,686 A | 9/1992 | Takashi et al. | |
| 5,191,439 A | 3/1993 | Sumi | |
| 5,696,850 A | 12/1997 | Parulski et al. | |
| 5,886,797 A | * 3/1999 | Shimura | 358/448 |
| 5,978,522 A | 11/1999 | Ishii et al. | |
| 5,995,248 A | * 11/1999 | Katori et al. | 358/3.27 |
| 6,281,992 B1 | * 8/2001 | Kondo | 358/1.9 |
| 2002/0031257 A1 | * 3/2002 | Kato | 382/167 |

FOREIGN PATENT DOCUMENTS

| | | |
|---|---|---|
| EP | 0 424 967 | 5/1991 |
| EP | 0 817 470 | 1/1998 |

OTHER PUBLICATIONS

Rafael C. Gonzalez and Richard E. Woods, Digital Image Processing, Addison–Wesley Publishing Company, Reading, Mass., 1993, pp. 270–272 and 279–282.
Pratt, W. K., "Digital Image Processing" 1991, Wiley, New York, Spatial Image Restoration Techniques, pp. 352–359.

* cited by examiner

*Primary Examiner*—Scott Rogers
(74) *Attorney, Agent, or Firm*—Raymond L. Owens

(57) ABSTRACT

A method for processing a digital image channel which is part of a digital image to compensate for MTF of one or more devices in an imaging chain from capture to printing including providing the MTF of the one or more devices in the imaging chain; providing a gain factor, using the MTF to provide an aim response; providing a filter from the aim response; and applying the filter to the digital image channel to provide a new digital image channel.

20 Claims, 6 Drawing Sheets

METHOD OF COMPENSATING FOR MTF IN A DIGITAL IMAGE CHANNEL

FIELD OF THE INVENTION

The invention relates generally to the field of digital image processing and, more particularly, to a method of compensating for MTF degradations in the imaging chain.

BACKGROUND OF THE INVENTION

Physical devices, such as capture or output devices in the imaging chain degrade the frequency content of the original image signal. Examples of capture devices include a CCD (charge coupled device), and a scanner for scanning a film negative. Examples of output devices are printers and displays in an imaging chain. For a linear shift-invariant (LSI) system, the specific nature of the degradation imposed by the device is referred to as the Modulation Transfer Function (MTF) of the device. The MTF basically specifies the frequency response of the device. Strictly speaking, the MTF specifies the relative attenuation or boost of the modulation of sinusoidal inputs to a given system or component. (MTF does not give phase information.) Each device or component of an imaging chain has an associated MTF. In addition, the MTF of several components may be cascaded (multiplicatively) by techniques well known in the art (see for example commonly-assigned U.S. Pat. No. 5,696,850.) Thus, the MTF of multiple devices or an entire system may be determined by cascading the MTF of the appropriate devices.

It is desirable to compensate for the MTF losses caused by one or more devices in the imaging chain at the most appropriate point. The most appropriate place to compensate for the MTF of the device is at the point that the device is used. For instance, if a CCD is used to capture an image in a digital camera, the MTF of the CCD should be compensated just after the image is captured. Changes to the original resolution and the inclusion of devices with additional MTF losses to the imaging chain make the compensation for the MTF of a device a much more difficult problem if the device compensation is separated from the location of the device in the image chain.

Currently, many image processing systems sharpen in only one place (often at the printer.) This one stage of sharpening attempts to compensate for the MTF losses of every device contained in the image chain. Additionally, part of the single stage sharpening is designed to boost the image detail for human preference. In this type of system, the change of any single component of the image chain may require the re-optimization of the sharpening. However, if the MTF of each device is compensated for, then the change of a single component of the image chain merely requires the determination of the MTF compensation for the new component by a pre-defined process.

In designing an MTF compensation scheme, the term "compensation" must be defined. In the past, a restrictive definition of compensation has been used and it requires that the sequential combination of the device and the device compensation has an MTF of 1.0 for all frequencies. This strict device compensation would be accomplished with an inverse filter, such as described by Gonzalas and Woods, in *Digital Image Processing*, Addison-Wesley Publishing Company, 1992, pp. 270–272. For example, the inverse filter is the design goal specified by commonly-assigned U.S. Pat. No. 5,696,850 when describing a method of performing a single sharpening operation to compensate for both input and output device. In practice, the application of an inverse filter would result in many problems, especially because the gain of the inverse filter would approach infinity where the MTF of the device approaches 0.0. Other factors making it impossible to attain good results from the inverse filter include noise, measurement error, limited device dynamic range, and device nonlinearities.

Because of the difficulties associated with strict device compensation, a more practical approach must be taken. Non-strict device compensation is a process by which the MTF of a device is restored within a reasonable delta of 1.0 for as great a frequency range as possible, giving preference to the lower frequencies. Note that the definitions of the terms "reasonable delta" and "frequency range" may vary.

Several non-strict device compensation methods can be found in the literature. Ohkouchi and Suzuki in U.S. Pat. No. 4,517,607 and Kamiya in U.S. Pat. No. 4,817,181 speak of MTF compensation, but the digital filter is held constant for any device. Thus, their MTF compensation does not at all depend upon the MTF of the device. Additionally, Takashi et al. in U.S. Pat. No. 5,144,686 also describe an MTF compensation that is independent of device MTF. While methods of sharpening images independent of the device MTF such as mentioned in this paragraph are certainly useful for producing higher quality images, it would be very useful to have a deterministic method of arriving at the non-strict device compensation based upon knowledge of the device MTF.

Sumi, U.S. Pat. No. 5,191,439 designed a sharpening system for compensating for device MTF. Although the combination of the printer and the compensation is considered, Sumi fails to describe a deterministic method of arriving at an acceptable non-strict device compensation based upon the device MTF.

Ishii et al., in U.S. Pat. No. 5,978,522 describes a method of modifying the sharpness characteristic of a digital image similar to the inverse filter described by commonly-assigned U.S. Pat. No. 5,696,850. However, Ishii utilizes an aim specific to the source of the image, or a user's preference, rather than an aim magnitude frequency response of 1.0 for all frequencies. This method has no guarantees that the compensation will not require high gains which will greatly amplify the noise in the system. In addition, this method may generate a compensation filter that is very large, since the filter is generated directly from an inverse Fourier transform of a filter aim. Also, each frequency is considered of equal importance to the correction.

The Wiener filter (commonly known in the art, for example described by Gonzalas and Woods, in *Digital Image Processing*, Addison-Wesley Publishing Company, 1992, pp. 279–282) is actually an attempt to apply a non-strict device compensation. The Wiener filter requires knowledge of both the magnitude and phase of the frequency response of the device, as well as the power spectrum of both the signal and the noise (although approximations can be made if the power spectra are unknown.) The Wiener filter uses the signal-to-noise-ratio (SNR) to limit the gain applied to any specific frequency. Generally, in a typical imaging device, the SNR of the higher frequencies is lower than the SNR of the low frequencies. As a result of the low SNR, the magnitude of the frequency response of the high frequencies is not restored to 1.0. Additionally, the low frequencies are generally allowed to be more accurately restored, assuming that the SNR is not low. Unfortunately, the Wiener filter is computationally intensive, requiring the use of a Fourier transform of the image (although the correction spectrum need be computed only once per device.) However, the desirable traits of the Wiener filter should be preserved when designing a strategy for non-strict device compensation.

SUMMARY OF THE INVENTION

It is an object of the present invention to provide an improved method for compensating for the MTF degradations of one or more devices in the imaging chain.

It is a further object of the invention to limit the overall gain of the compensation so that noise is not excessively amplified.

These objects are achieved in a method for processing a digital image channel which is part of a digital image to compensate for MTF of one or more devices in an imaging chain from capture to printing comprising the steps of:

(a) providing the MTF of the one or more devices in the imaging chain;

(b) providing a gain factor, using the MTF to provide an aim response;

(c) providing a filter from the aim response; and (d) applying the filter to the digital image channel to provide a new digital image channel.

It is an advantage of the present invention that the MTF in one or more devices in the imaging chain can be effectively compensated for and provide a compensated digital image channel.

It is an important feature of the present invention that by providing a gain factor and using such gain factor and the MTF an aim response can be provided. The filter is developed from the aim response by using a weighted fitting in the frequency domain.

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein may be selected from such materials, components and elements known in the art. Given the description as set forth in the following specification, all software implementation thereof is conventional and within the ordinary skill in such arts.

Figure 1:
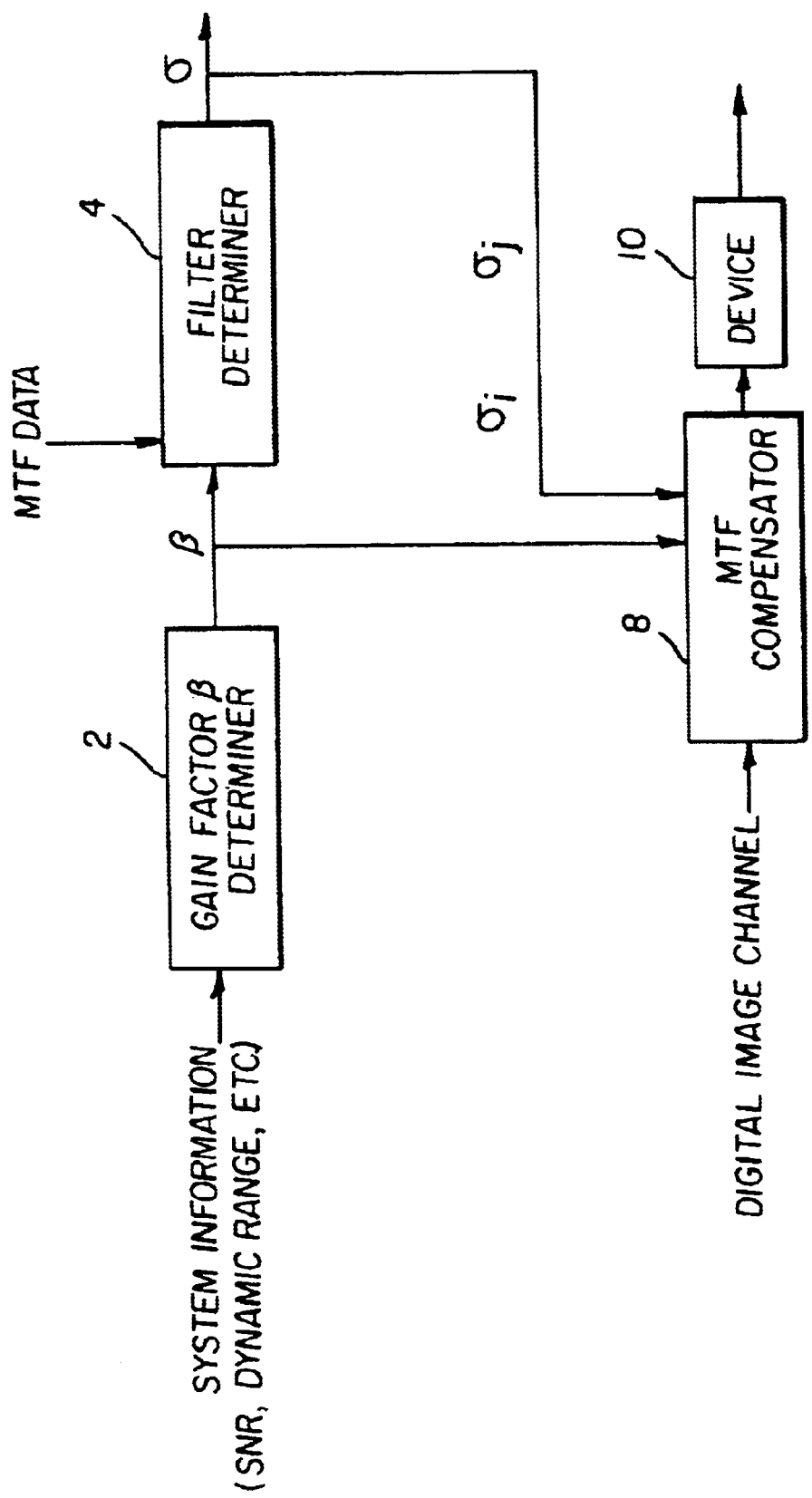
FIG. 1 is a block diagram illustrating an overview of a preferred embodiment of the present invention.

Referring to FIG. 1, there is illustrated an overview of the present invention. It is instructive to note that the present invention utilizes a digital image which is typically a two-dimensional array of red, green, and blue pixel values, or a single monochrome pixel value corresponding to light intensities. In addition, a preferred embodiment is described with reference to a digital image of 1024 rows of pixels and 1536 lines of pixels. The value of a pixel of a digital image located at coordinates (x,y), referring to the $x^{th}$ row and the $y^{th}$ column of the digital image shall herein consist of a triad of values [r(x,y), g(x,y), b(x,y)] respectively referring to the values of the red, green, and blue digital image channels at location (x,y). In this regard, a digital image consists of a certain number of digital image channels. In the case of a digital image consisting of red, green and blue two-dimensional arrays, the image consists of exactly three channels. The value of a pixel of a digital image channel n located at coordinates (x,y), referring to the $x^{th}$ row and the $y^{th}$ column of the digital image channel shall herein be a single value referred to as n(x,y). The term "digital image channel" will be understood to encompass a single plane of a digital image. For example, if a digital image has red, green and blue components there are three channels. Also if a digital image is specified in terms of luminance, there is a luminance channel. The present invention can be applied to one or more digital image channels. For purposes of the present invention each digital image channel may be considered to be a digital image.

The present invention relates to a method for processing a digital image channel to compensate for MTF degradations in one or more devices in an imaging chain from capture to output. The MTF can be that of a single device which provides significant distortion of a digital image channel either during capture or processing.

Note that the present invention may be applied to a single digital image channel (for instance, the red channel, the green channel, the blue channel, or the luminance channel), several digital image channels of a digital image, or all the digital image channels of the digital image.

Note that the present invention does not specify the source of the digital image. The digital image may, for example, be captured with a digital camera. The digital image may also one of a motion picture sequence. Additionally, the digital image may not represent any actual scene, and may be a simulated computer rendering or a graphic drawing or design.

The digital image channel is input to the MTF compensator 8. The purpose of the MTF compensator 8 is to prepare the frequency content of the digital image channel for the MTF degradation that occurs when the image is passed through the devices or image transforms causing the MTF losses described by the MTF. For this description, the MTF is assumed to be caused by a device 10. Typically, this device 10 is an output device, such as a CRT monitor, a CRT silver halide printer, an ink jet printer or the like. However input devices such as CCDs, film or the like also have associated MTFs, in which case the MTF compensator 8 may follow the device 10. Note that the response of an observer (human or otherwise) may be considered to be a device 10 in the imaging chain. Therefore, the digital image channel may be compensated for the MTF of the observer (in the art the MTF of a human observer is referred to as the contrast sensitivity function) with the method described in this embodiment.

The function of the MTF compensator 8 is to apply a filter to the digital image channel to provide a new digital image channel compensated for MTF by modifying the digital image input to the MTF compensator 8 in such a way that the image output from the device 10 is as similar as practically possible (within some delta) to the image input to the MTF compensator 8 in terms of image structure and detail.

In the preferred embodiment, the MTF compensator 8 performs an unsharp mask operation as is well known by those skilled in the art of image processing. The unsharp mask utilizes a gain factor β and a lowpass filter provided by a filter determiner 4. In the preferred embodiment, the lowpass filter is a Gaussian filter. A Gaussian filter has been selected as the filter of choice because it has several desirable characteristics. A two dimensional Gaussian filter is separable into two one dimensional Gaussian filters, one horizontal and the other vertical. In addition, a radially symmetric Gaussian filter had a frequency response that is radially symmetric. A Gaussian filter is the only FIR (finite impulse response) lowpass filter that has the characteristics of separability and radial symmetry in both the space and frequency domains.

The MTF compensator 8 applies an unsharp mask operation in which the gain factor β provided by the determiner 2 and the characteristics of the lowpass filter produced by the filter determiner 4 are optimized in order to provide an effective compensation for the MTF. To this end, the β determiner 2 inputs device information such as SNR (Signal to Noise Ratio) of the device 10 or the imaging chain, power spectrum, dynamic range of the device 10 or the imaging chain, and any other information which may be a reason for setting a limit on the gain of the unsharp mask. In the preferred embodiment, the gain factor β determiner 2 simply sets the value of β to 2.5. In this manner, the gain factor β is predetermined. It is recommended that the value of β not exceed 5.0 for typical devices such as those previously mentioned.

In addition, the filter determiner 4 inputs both the value of output from the gain factor β determiner 2 and the MTF. The operation of the filter determiner 4 is to determine the Gaussian filter parameter σ corresponding to the lowpass filter that, when used in the unsharp mask of the MTF compensator 8 along with gain β, provides an optimal compensation for MTF. The filter determiner 4 operated by performing a weighted least squares fit (over σ) in the frequency domain of the magnitude response of a Gaussian filter to an ideal filter response. The weighted least squares fit and the creation of an ideal filter response from the device MTF will be described in greater detail hereinbelow.

Figure 2:
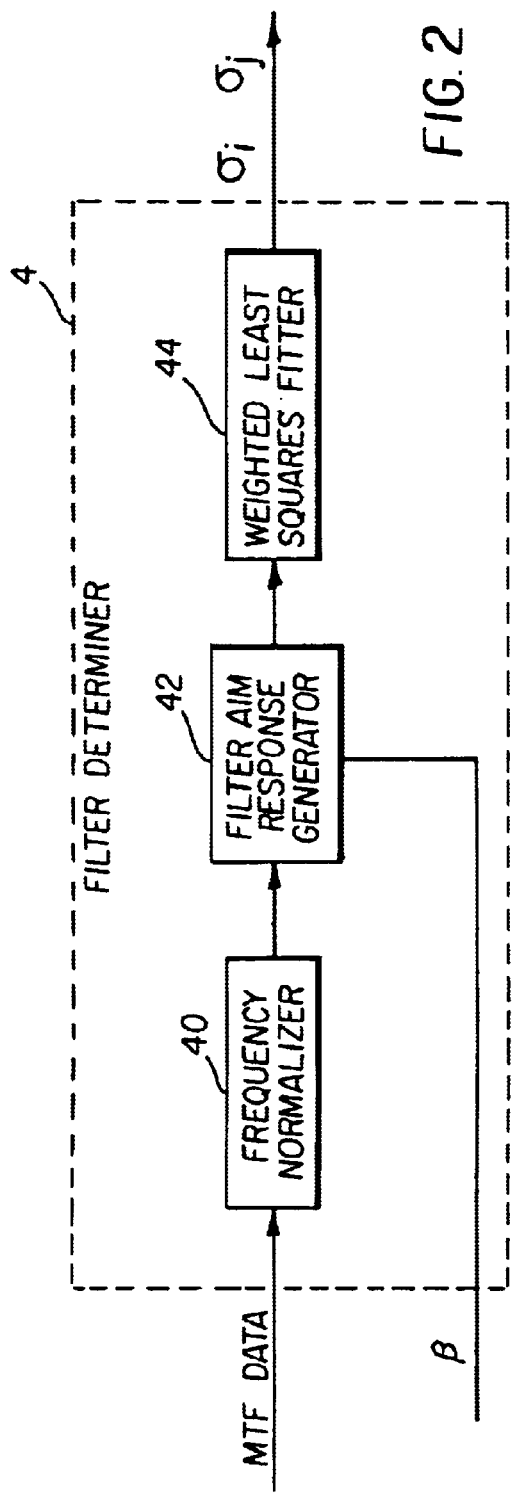
FIG. 2 shows a more detailed block diagram of the filter determiner for FIG. 1.

The filter determiner 4 requires the inputs of the MTF data of the device 10 and the gain factor value β. Note that the MTF data may be dependent upon which digital image channel has been input to the MTF compensator 8. For example, the MTF of a digital printer for the red digital image channel is usually significantly different from the MTF of the same digital printer for the blue digital image channel. It is important the appropriate MTF data (relating to the digital image channel input to the MTF compensator 8) is input to the filter determiner 4. Additionally, the MTF data corresponding to the device 10 may need to be specified according to direction. It is common to measure the MTF of a device in both the "fast" and "slow" scan directions. Alternatively, the MTF of a device may be specified as a full two dimensional response function rather than two one-dimensional responses. An exploded block diagram of the filter determiner 4 may be viewed in FIG. 2. The MTF data input to the filter determiner 4 is input to the frequency normalizer 40. MTF data is preferably specified in the present invention as a two column table, the first column relating to frequency and the second column relating to the magnitude of the frequency response (MTF) corresponding with that frequency in the specified scan direction. For example, the MTF of a CRT printer in combination with a typical photographic paper (for the red channel in the horizontal direction) is given in the following table:

| Frequency (cycles/mm) | MTF of Red channel in Horizontal Direction |
| --- | --- |
| 0.000000e + 00 | 1.000000e + 00 |
| 5.000000e − 01 | 9.512699e − 01 |
| 1.000000e + 00 | 8.171171e − 01 |
| 1.500000e + 00 | 6.699246e − 01 |
| 2.000000e + 00 | 5.289917e − 01 |
| 2.500000e + 00 | 4.025696e − 01 |
| 3.000000e + 00 | 2.946993e − 01 |
| 3.500000e + 00 | 2.085783e − 01 |
| 4.000000e + 00 | 1.459891e − 01 |
| 4.500000e + 00 | 1.068113e − 01 |
| 5.000000e + 00 | 8.508064e − 02 |
| 5.500000e + 00 | 7.349594e − 02 |
| 6.000000e + 00 | 6.475624e − 02 |
| 6.500000e + 00 | 5.156054e − 02 |

The purpose of the frequency normalizer 40 is to convert the frequency axis of the MTF data (commonly specified in cycles/mm) to a normalized frequency metric. This normalized frequency metric is preferably based upon the resolution of the digital image at the point where the image is input to the MTF compensator 8.

This can be accomplished by the equation:

$$f = f_{cmm} \text{ cycles/mm} * 25.4 \text{ mm/inch} * (P)^{-1} \text{ 2 dots/cycle} = f_{cmm} * 25.4 * 2 * (P)^{-1}.$$

Where f is normalized frequency, P is the resolution of the printer in dots per inch and $f_{cmm}$ is the frequency represented in units of cycles/mm. In this example, a normalized frequency of 1.0 represents the highest frequency possible in the digital image channel (each cycle is 2 pixels). In alternative embodiments, the MTF data can be expressed so that a normalized frequency other than 1.0 represents the highest possible frequency of the digital image channel. For example it is common to represent the maximum possible frequency of a sampled signal as ½ or π. MTF data is generated for any frequency for which MTF data does not exist by use of a spline through existing data points. (The extrapolated MTF data is forced to be within the range of 0.0 and 1.0.)

Again with regard to FIG. 2, the normalized MTF data output from the frequency normalizer 40 is then input to the filter aim response generator 42. The filter aim response generator 42 determines the aim of the lowpass filter to used in an unsharp mask framework with the specified gain factor β in order to determine the "best" device compensation possible, without regard to the constraints of digital filter design. A series of steps is required to generate the filter aim response from the device 10 MTF data. In this regard, capital variables refer to the Fourier Transform of the image signals or filters with the corresponding lower-case designation. For instance, with regard to FIG. 3, B(u,v) represents the Fourier transform of the signal b(x,y), and F(u,v) is the Fourier Transform of the lowpass filter f(i,j) used in the unsharp mask. The operation of an unsharp mask may be described by the following equation in spatial domain:

$$b(x,y)=a(x,y)f(i,j)+\beta[a(x,y)-a(x,y)f(i,j)]$$

where ** represents a two dimensional convolution. Note that it is commonly known in that art that an unsharp mask is also often implemented as:

$$b(x,y)=a(i,j)+\gamma[a(x,y)-a(x,y)**f(i,j)]$$

Note that the preceding two equations are equivalent if $\beta=\gamma+1$. Such a variation of the unsharp mask equation is well known in the art, and the effects may be cascaded throughout the development of a preferred embodiment of the present invention without substantially altering the performance of the method described herein.

The frequency response of an unsharp mask 12 (See FIG. 3) may be described by the following equation:

$$\frac{|B(u,v)|}{|A(u,v)|} = \beta(1-|F(u,v)|)+|F(u,v)|$$

Figure 3:
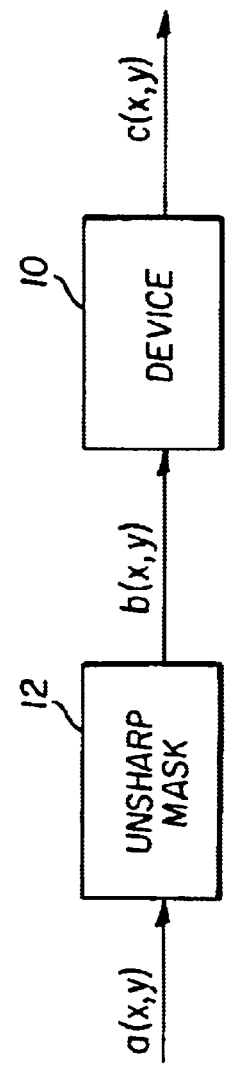
FIG. 3 depicts an unsharp mask which applies an output signal to device 10 shown in FIG. 1.

Therefore, the MTF of the serial combination of an unsharp mask 12 and the device 10 shown in FIG. 3 is given as the product of the MTFs of these two components:

$$\frac{|C(u,v)|}{|A(u,v)|} = \{\beta(1-|F(u,v)|)+|F(u,v)|\}|R(u,v)|$$

Where $|R(u,v)|$ is the magnitude of the frequency response of the device 10 under consideration.

Referring again to FIG. 2, the goal of the filter aim response generator 42 is to find $|\tilde{F}(u,v)|$ that makes the value of the cascaded MTF ($|C(u,v)|/|A(u,v)|$) as close to 1.0 as possible, given the value of the gain factor $\beta$ and the MTF of the device 10 $|R(u,v)|$.

Thus, the filter aim response generator 42 computes filter aim response $|\tilde{F}(u,v)|$ by the following equation:

$$|\tilde{F}(u,v)| = \max\left[\frac{1.0-\beta|R(u,v)|}{|R(u,v)|(1.0-\beta)}, 0\right]$$

Note that $\beta$ may not equal one.

In the preferred embodiment, the MTF is assumed to be separable in the vertical and horizontal directions. In this case, the MTF of the device in the horizontal direction is represented by $|R(u)|$, and the MTF of the device in the vertical direction is represented as $|R(v)|$. Thus, the filter aim response generator 42 outputs two filter aim responses, $|\tilde{F}(u)|$ for the horizontal direction and $|\tilde{F}(v)|$ for the vertical direction, according to the following equations:

$$|\tilde{F}(u)| = \max\left[\frac{1.0-\beta|R(u)|}{|R(u)|(1.0-\beta)}, 0\right]$$

$$|\tilde{F}(v)| = \max\left[\frac{1.0-\beta|R(v)|}{|R(v)|(1.0-\beta)}, 0\right]$$

The problem of filter design is greatly simplified by considering only a single dimension (vertical or horizontal) of MTF data at a time. The preceding equations relate the method by which the filter aim response generator 42 determines a filter aim response dependent upon the gain factor $\beta$ and the MTF of the device 10, denoted by $|R(u,v)|$.

Each filter aim response $|\tilde{F}(u)|$, for example, output from the filter aim response generator 42 is then input to the weighted least squares fitter 44. The weighted least squares fitter 44 constructs a filter $\hat{f}(i)$ whose frequency response $|\hat{F}(u)|$ is as similar as possible to the filter aim response $|\tilde{F}(u)|$. A number of techniques well known in the art of filter design are available to construct such a filter. For example, $\hat{f}(i)$ may be calculated as the inverse Fourier transform of $|\tilde{F}(u)|$. This ensures that $|\hat{F}(u)|=|\tilde{F}(u)|$. However, $\hat{f}(i)$ may then consist of a large number of samples. In addition, a filter produced by this method may not have good radial symmetry properties when considered together with $\hat{f}(j)$. In order to ensure a reasonable filter size as well as good radial symmetry properties, $\hat{f}(i)$ is forced to be a Gaussian filter, as will be detailed hereinbelow. The filters $\hat{f}(i)$ and $\hat{f}(j)$ are preferably constructed from $|\tilde{F}(u)|$ and $|\tilde{F}(v)|$ by a similar method.

In an alternative embodiment, the filter aim response $|\tilde{F}(u,v)|$ may be output from the filter aim response generator 42 and then input to the weighted least squares fitter 44. The weighted least squares fitter 44 constructs a filter $\hat{f}(i,j)$ whose frequency response $|\hat{F}(u,v)|$ is similar to the filter aim response $|\tilde{F}(u,v)|$. A number of techniques well known in the art of filter design are available to construct such a filter. For example $\hat{f}(i,j)$ may be calculated as the inverse Fourier transform of $|\tilde{F}(u,v)|$. This ensures that $|\hat{F}(u,v)|=|\tilde{F}(u,v)|$. However, $\hat{f}(i,j)$ may then consist of a large number of samples. The filter $\hat{f}(i,j)$ may be constrained to be a Gaussian filter.

A Gaussian filter is well known in the art of digital signal processing. An unnormalized one-dimensional Gaussian filter $f_U(m)$ can be expressed with the following equation:

$$f_U(m) = \sum_{k=-\left(\frac{l-1}{2}\right)}^{\left(\frac{l-1}{2}\right)} \delta(k-m)\exp\left[-\frac{(m-c)^2}{2\sigma^2}\right]$$

where l is an odd integer equal to approximately $6\sigma$, $c=(l-1)/2$, and $\delta(x)$ is the well known Dirac delta function. The Dirac delta function $\delta(x)=1$ for $x=0$, and $\delta(x)=0$ for all other values of x. The Gaussian filter $f_G(m)$ is obtained by normalizing $f_U(m)$ such that the sum of the filter coefficients (and consequently the DC gain) equals 1.0.

The weighted least squares fitter 44 determines an optimal lowpass filter to compensate for the MTF by performing a weighted least squares fit in the frequency domain. The weighted least squares fitter 44 produces a filter from the filter aim response. The operation of the weighted least squares fitter 44 is herein described with reference to the one-dimensional filter aim response $|\tilde{F}(u)|$. However, it should be understood that all operations are repeated to operate upon $|\tilde{F}(v)|$. In addition, those skilled in the art will recognize that the operation of the weighted least squares fitter 44 may alternatively be modified to operate upon a two-dimensional filter aim response $|\tilde{F}(u,v)|$.

The filter determined by the weighted least squares fitter 44 when operating upon the filter aim response $|\tilde{F}(u)|$, is the filter $\hat{f}(i)$ which minimizes the following expression:

$$\min_{\hat{f}(i)}[\hat{F}(u)-\tilde{F}(u)]^2 W(u)$$

where W(u) is a weighting function. Possibilities for the weighting function W(u) will be discussed herein below. As previously stated, the preferred embodiment of the weighted least squares fitter 44 assumes that the filter f̂(i) is a Gaussian filter. Since a Gaussian filter is completely specified with σ, the number of samples per standard deviation of the Gaussian filter, the optimization problem is reduced to an optimization over σ:

$$\min_{\sigma}[\hat{F}(u)-\tilde{F}(u)]^2 W(u)$$

Optimization techniques and software packages capable of solving the minimization problem are commonly available. Note that the preferred embodiment utilizes a minimization of an expression containing a squared difference. Many other expressions, for example absolute difference, are available for expressing the distance between two functional expressions. This disclosure is intended to cover all such expressions.

The weighting term W(u) is preferably a monotonically decreasing function designed to place more importance on lower frequencies for the MTF compensation. Note that by setting W(u)=c, where c is a constant, essentially removes all effects of the weighting function. In the preferred embodiment, the weighting function is formed from the filter aim response, $$W(u)=\tilde{F}(u)^K$$

The weighting function W(u) may also be a function of the MTF of the device 10, for example.

Experimentation has shown K=2 to achieve a good compensation of the MTF. A value of K=0 forces W(u)=1, and generally results in the low frequency content of an image being overcompensated. Increasing the value of K causes the weighted least squares fitter 44 to more accurately fit the lower frequencies of the desired filter aim response.

As an alternative, the weighting function W(u) may be the contrast sensitivity function of the human visual system. This alternative is especially applicable when the device 10 is an output device. Functions of this kind are well known in the art of image processing.

In the preferred embodiment, the weighted least squares fitter 44 outputs the results for both the horizontal and vertical MTFs, represented by $\sigma_i$ and $\sigma_j$.

Note that although the weighted least squares fitter 44 was described with reference to an optimization in the frequency domain, it is possible to achieve a similar result in the spatial domain. For example, the filter f̂(i) could be generated by designing a filter similar to the inverse Fourier transform of |F̃(u)|.

Figure 6:
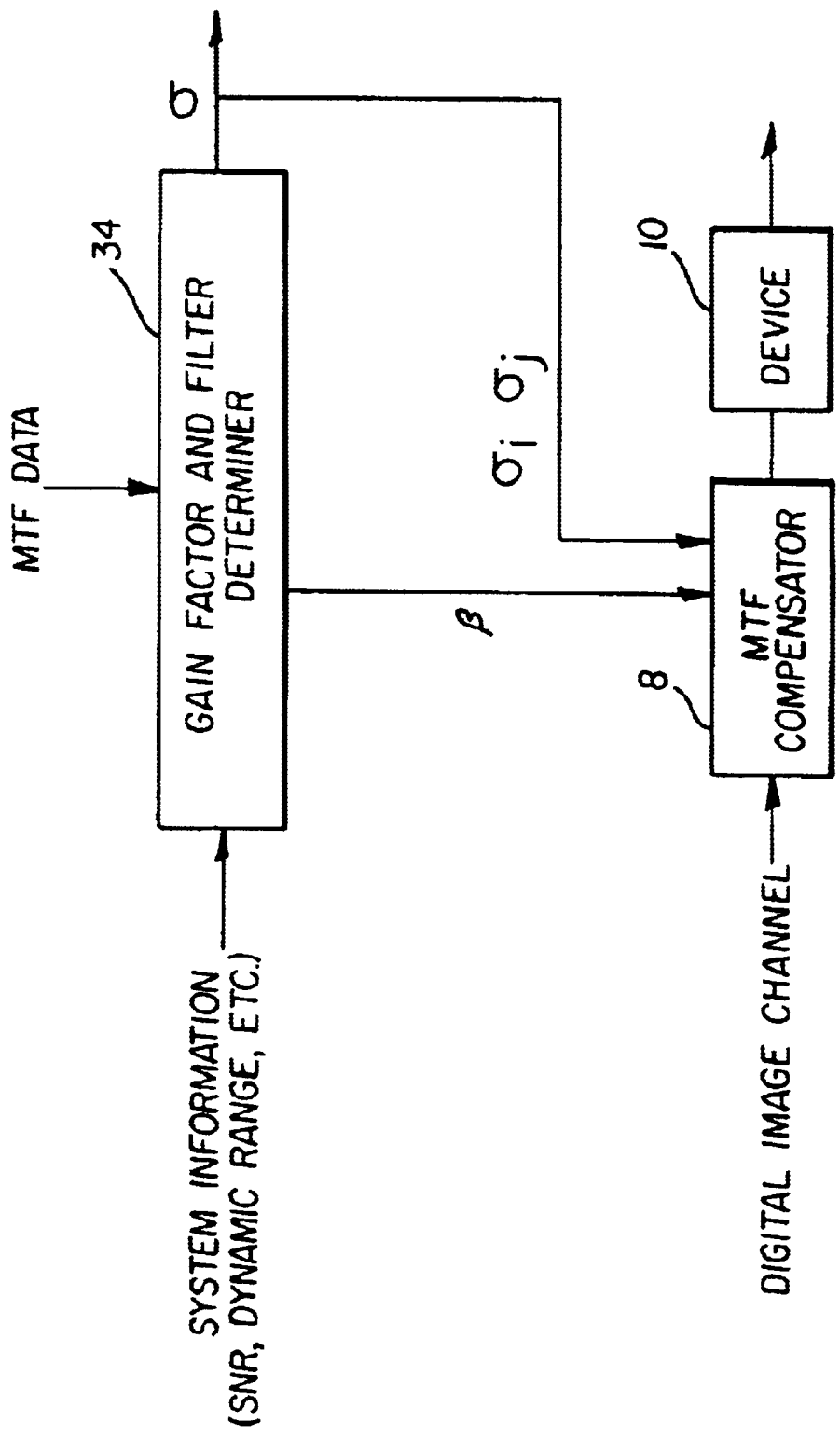
FIG. 6 shows a block diagram showing an alternative embodiment of the present invention.

As an alternative embodiment to having the separate gain factor β determiner 2 and the filter determiner 4, consider FIG. 6. In this embodiment, the gain factor B and the digital filter or filters are jointly determined by a gain factor and filter determiner 34. This approach is more general than that of the preferred embodiment, where the gain factor β and the filter are sequentially determined.

Figure 4:
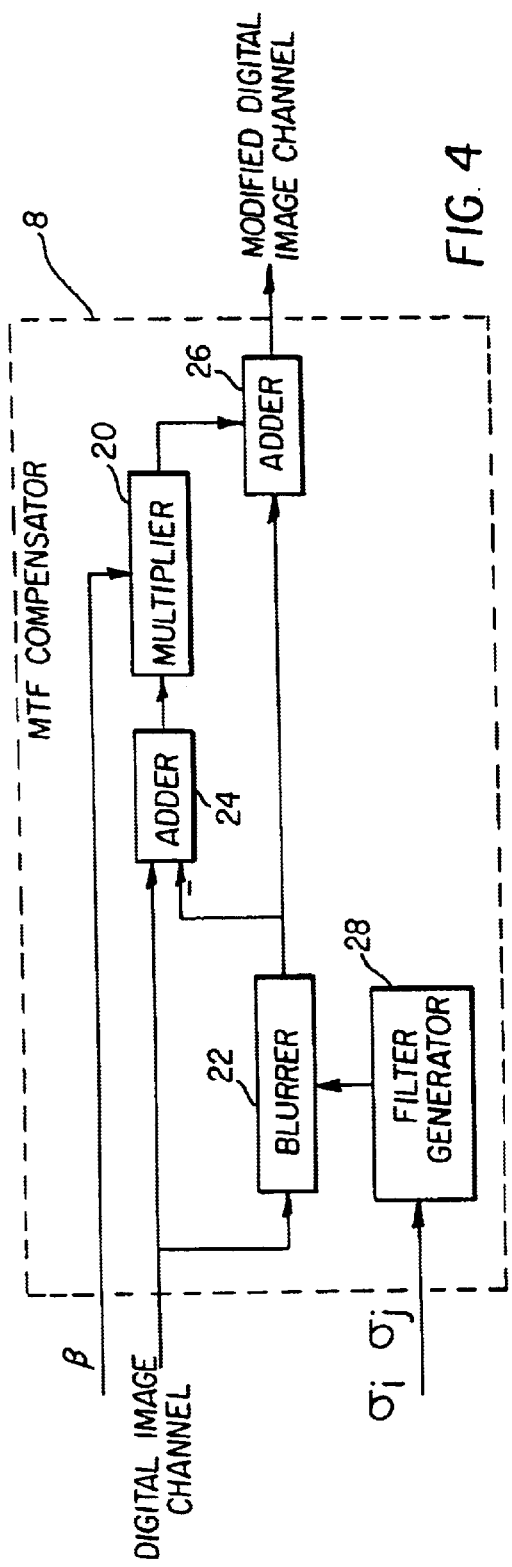
FIG. 4 is a detailed block diagram of the MTF compensator 8 shown in FIG. 1.

FIG. 4 illustrates how the output of the gain factor β determiner 2 and the filter determiner 4 are utilized to achieve an MTF compensation. The MTF compensator 8 inputs the gain factor β and $\sigma_i$ and $\sigma_j$ output from the filter determiner 4. The filter generator 28 constructs and outputs two normalized one-dimensional Gaussian filters f̂(i) and f̂(j), the equation of which has been disclosed hereinabove. As an alternative embodiment, the filter generator 28 may convolve the two normalized one-dimensional filters to generate a single two-dimensional filter by the following equation:

$$\hat{f}(i,j)=\hat{f}(i)\cdot\delta(j)\hat{f}(j)\cdot\delta(i)=\hat{f}(i)\hat{f}(j)=\hat{f}(i)\cdot\hat{f}(j)$$

As a further alternative embodiment, the filter determiner 4 may pass one or more filters directly to the filter generator 28, in which case the filter generator 28 would simply output the filter or filters.

The digital image channel is passed to the blurrer 22. The purpose of the blurrer 22 is to perform a convolution of the digital image channel with the filter or filters input from the filter generator 28 in order to form a lowpass image. In the preferred embodiment, the blurrer 22 operates by convolving the digital image channel by f̂(i) in a first blurring stage. A second blurring stage follows the first by convolving the output of the first blurring stage by the filter f̂(j). Alternatively, if a single two-dimensional filter is output from the filter generator 28, then the blurrer 22 performs only a single convolution with the filter f̂(i,j).

The lowpass signal output from the blurrer 22 is input to the adder 24 along with the digital image channel. The output of the adder 24 is the highpass signal, formed by adding the digital image channel with the negative of the lowpass signal, according to the equation:

$$n_{hp}(x,y)=n(x,y)+(-n_{lp}(x,y))$$

where $n_{hp}(x,y)$ is the highpass signal, n(x,y) is the digital image channel, and $n_{lp}(x,y)$ is the lowpass signal.

The multiplier 20 generates a modified highpass signal $n_{hp}'(x,y)$ by applying the gain factor β to the highpass signal according to the following equation:

$$n_{hp}'(x,y)=\beta n_{hp}(x,y)$$

The adder 26 adds the modified highpass signal to the lowpass signal to form a modified digital image channel n'(x,y), according to the equation:

$$n'(x,y)=n_{hp}'(x,y)+n_{lp}(x,y)$$

This modified digital image channel is output from the MTF compensator 8 and is prepared for the MTF of the device 10, the MTF of the system, or the MTF of a combination of devices.

Figure 5:
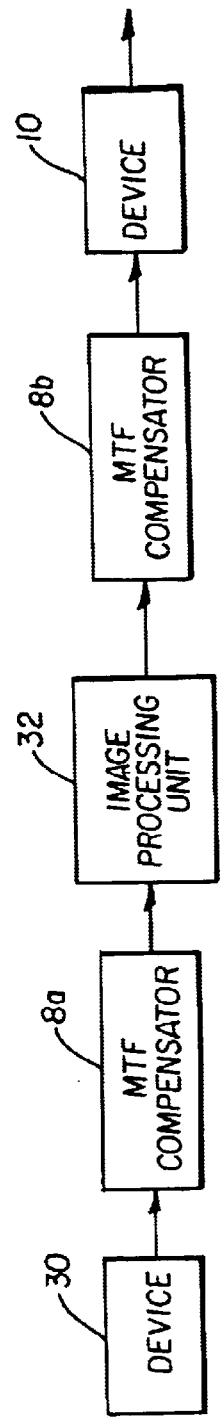
FIG. 5 shows an imaging chain with multiple devices.

As shown in FIG. 5, an imaging chain contains one or more devices. In this figure two devices 10 and 30 shown. For example, in the case of a system that scans film and then prints the resulting image, there is a CCD for capturing the image, and the device 10 (an output device such as a CRT monitor for viewing the image.) The input device 30 may be the capture CCD, the film, the camera lens, or any combination of these devices. Each of these devices has an associated MTF. FIG. 5 illustrates that a MTF compensation 8a can be created for the input device 30. This MTF compensation 8a would utilize the MTF of the input device 30 for generating the gain factor β and the filter. FIG. 5 also demonstrates that an independent MTF compensator 8b can be utilized in order to compensate for an output device 10, as previously described. Thus, MTF compensators 8a and 8b can utilize optimized gain factors and filters generated specifically for the devices 10 and 30. Notice that it is generally advisable to apply the MTF compensator 8 as near in the imaging chain as possible to the device for which the MTF compensator is optimized. In the case of an input device 30, the MTF compensator 8a immediately follows the device 30. However, in a practical system it is conceivable that the MTF compensator 8 may be separated from the device 30 by several image processing steps, for instance noise reduction. In the case of an output device 10, the MTF compensator 8b is applied as the last operation before the image is passed to the device 10. Those skilled in the art may insert an image processing operation between the MTF compensator 8b and the output device 10 if doing so saves computational cost. For example a cropping operation will reduce the number of pixels in the digital image channel, so computation should not be spent computing MTF compensation at pixel locations that are to be cropped.

The MTF compensator 8 can be used for the purpose of compensating for the combined effects of all devices in the imaging chain. If the image processing unit 32 contains no changes to the image spatial resolution, configuring the MTF compensator 8 to counteract the MTF of the input device 30 and the output device 10 is a simply matter of inputting to the filter determiner 4 the multiplication of the two devices' MTFs (a cascade of all the MTFs of the devices in the imaging chain is referred to as the system MTF.) Combining the MTF responses of several devices in an imaging chain to form a system MTF is well known in the art. Commonly-assigned U.S. Pat. No. 5,696,850 describes a method of generating a system MTF even if the image processing unit 32 contains operations which modify the image spatial resolution, such as decimation or interpolation.

As a further alternative embodiment, consider FIG. 6. In this embodiment, the gain factor B and the digital filter or filters are jointly determined by a gain factor and filter determiner 34. This approach is more general than that of the preferred embodiment, where the gain factor β and the filter are sequentially determined.

Figure 7:
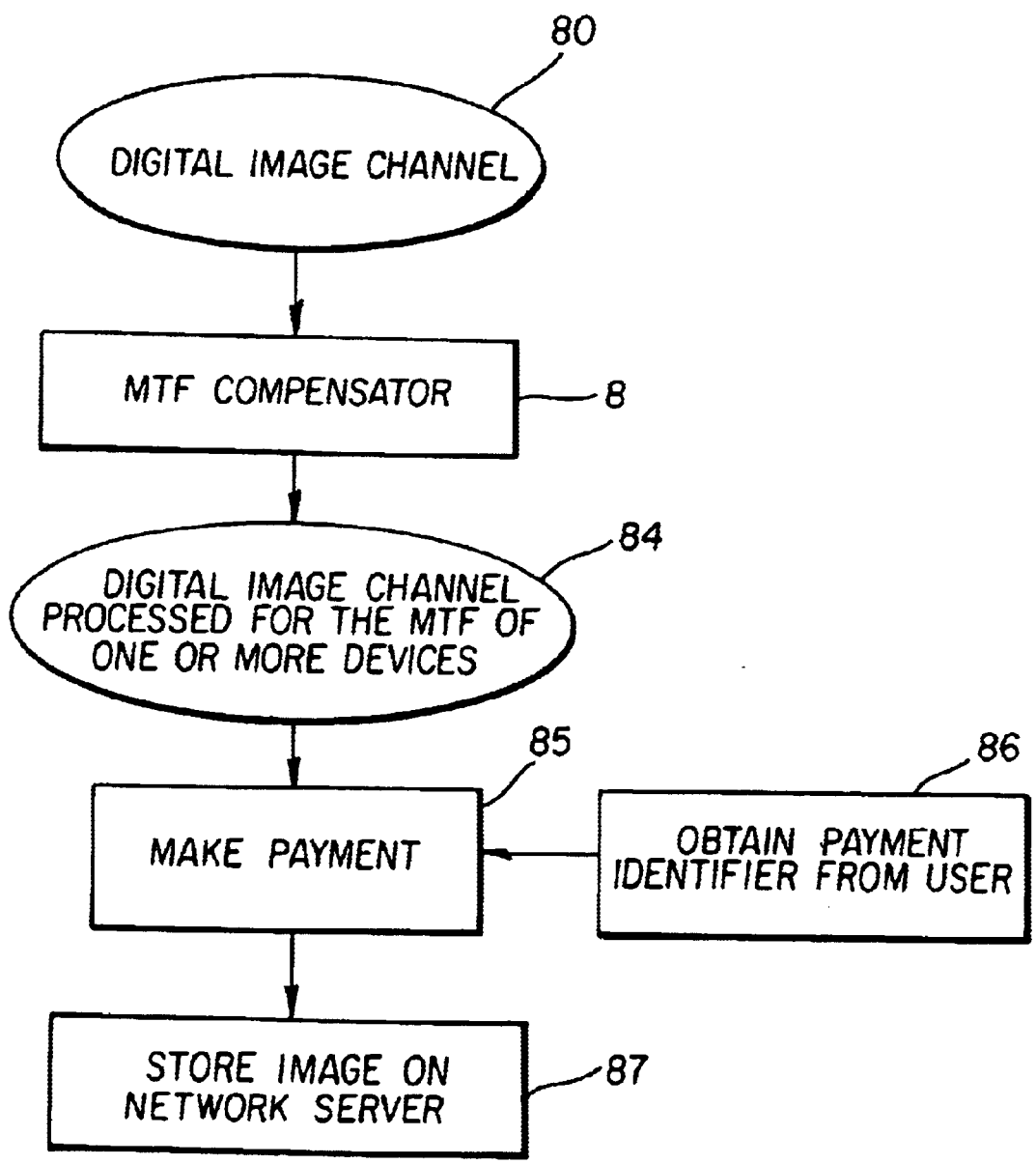
FIG. 7 is a flowchart showing the processing of the extended color gamut digital image in accordance with the present invention.

FIG. 7 shows a flowchart for a preferred embodiment of the present invention where digital image channels compensated for MTF of a device are stored on a network server such that they can be made available via a digital communications network. First, one or more digital image channels 80 are sent to a processing site by a user. Note that the user may also send information such as MTF of a printer 102 or a printer identification code. In one embodiment of the present invention this is accomplished by the user supplying photographic film negatives to the processing site, either by mail, or by delivering the negatives to a processing site. The negatives can be in a developed or undeveloped form. The negatives would then be developed if necessary, and then scanned to produce digital image channels 80. Alternatively, the digital image channels 80 could be supplied directly by the user, either over a communications network, or on a computer readable storage medium such as a magnetic disk, a CDROM, or a PCMCIA card. The digital image channels 80 could originate from a digital camera, or alternatively could originate from scans of conventional photographic materials such as prints, slides or negatives. The digital image channels 80 could also originate from computer generated imagery.

Next, each digital image channel 80 is processed using a MTF compensator 8 to produce a digital image channel compensated for the MTF of one or more devices. The operation of the MTF compensator has been previously described herein.

A make payment step 85 is used to obtain payment from the user. This can be done using a cash transaction, or by using an obtain payment identifier from user step 86. For example, the payment identifier can include information about an account from which payment is to be electronically transferred. Alternatively, the payment identifier can include a credit card account where the payment is to be debited. Other forms of payment identifiers are also possible including a check, etc. In one embodiment of the present invention, the payment identifier is obtained from the user via a digital communications network such as the internet.

Finally, a store image on network server step 87 is used to make the digital image channel compensated for the MTF of one or more devices 84 available to the user via a digital communications network. Examples of a digital communications network would include the internet and a local area network. In one embodiment of the present invention, the digital image channel compensated for the MTF of one or more devices 84 is made available to the user at a specific internet address. The user may be supplied with a password in order to access the digital image channel compensated for the MTF of one or more devices 84, or alternatively, the digital image channel compensated for the MTF of one or more devices 84 might be publicly available. In another embodiment of the present invention, digital image channel compensated for the MTF of one or more devices 84 can be transferred to a location designated by the user via the digital communications network. For example, the digital image channel compensated for the MTF of one or more devices 84 could be sent by E-mail, or could be transferred using a file transfer protocol. In another embodiment of the present invention, the digital image channel compensated for the MTF of one or more devices 84 can be transferred to a location designated implicitly by the user via the digital communications network. For example the digital image channel compensated for the MTF of one or more devices 84 may be transferred to a location nearest an address specified by the user for printing on an output device. This transferring of the digital image channel compensated for the MTF of one or more devices 84 to the location nearest the user for printing will allow for a fast transfer of the output to the address specified by the user. Additionally, in this embodiment, the MTF supplied to the filter determiner 4 can be the MTF information associated with a device at the location to which the digital image channel compensated for the MTF of one or more devices 84 is transferred.

Figure 8:
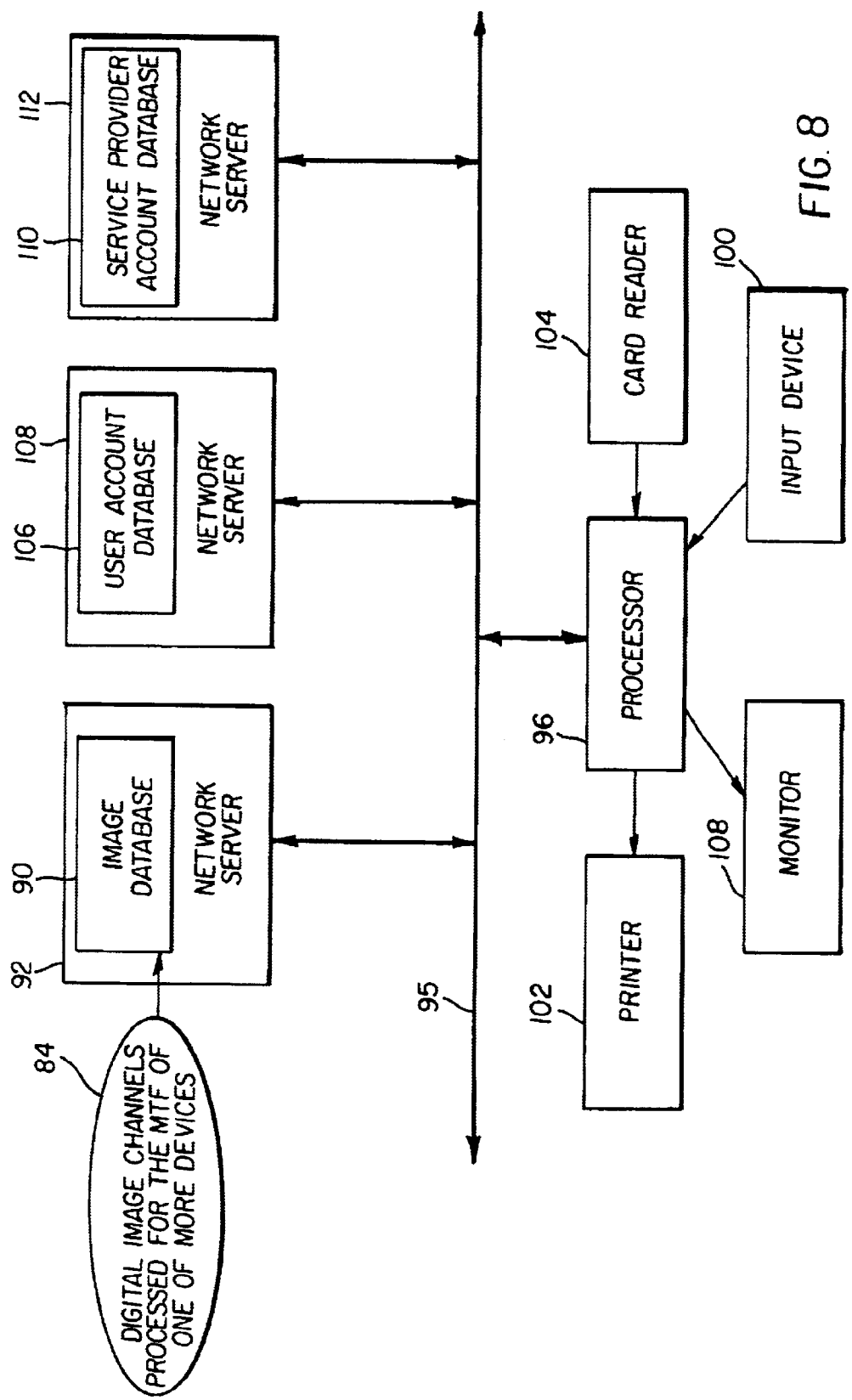
FIG. 8 illustrates a communications network configuration for practicing the current invention.

FIG. 8 illustrates an embodiment of the present invention digital image channels compensated for the MTF of one or more devices 84 are accessed by a digital communications network, such as the internet. In this case, an image database 90 is located on a network server 92. The image database 90 is used to store digital image channel compensated for the MTF of one or more devices 84 that have been processed using the methods described earlier. The network server 92 is connected to a communications network 95. For example, the communications network 95 could be the internet, or a local area network. A user uses a processor 96 to access the network server 92 via the communications network 95. The processor 96 can be a home computer, or alternatively it could be a computer in a retail kiosk, etc. Typically, the processor would use a monitor 98 for the purpose of displaying preview images, and providing information to the user. One or more input devices 100 can be used by the user to provide instructions to the processor 96. Examples of typical input devices would include a keyboard, a mouse, a trackball, a touch pad or a touch screen. A printer 102 may also be connected to the processor for providing output prints to the user. Alternatively, a remote printer could also be accessed over the communications network 95. A card reader104 can also be connected to the processor 96 for purposes of reading account information from a credit card or a debit card as part of the obtain payment identifier from user step 86 that was discussed earlier.

Other network servers can also be attached to the communications network 95. For example, consider the case where a user makes payment via the internet. One common way for the user to provide a payment identifier to a service provider would be for him or her to supply a valid credit card number. The service provider would then access a user account database 106 on a network server 108 to debit the appropriate payment, which would then be credited to an account specified by the service provider by accessing a service provider account database 110 on another network server 112. After the payment has been transferred, the service provider would then provide the user access to the digital image channels compensated for the MTF of one or more devices 84 stored in the image database 90.

A computer program product can have one or more computer readable storage media disposed in different processing locations, each having a computer program stored thereon for performing all the steps of the present invention.

Each computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

| PARTS LIST | |
|---|---|
| 2 | determiner |
| 4 | filter determiner |
| 8 | MTF compensator |
| 8a | MTF compensation |
| 8b | MTF compensator |
| 10 | device |
| 12 | unsharp mask |
| 20 | multiplier |
| 22 | blurrer |
| 24 | adder |
| 26 | adder |
| 28 | filter generator |
| 30 | input device |
| 32 | image processing unit |
| 34 | filter determiner |
| 40 | frequency normalizer |
| 42 | response generator |
| 44 | fitter |
| 80 | digital channels |
| 84 | devices |
| 85 | payment step |
| 86 | user step |
| 87 | server step |
| 90 | database |
| 92 | server |
| 95 | network |
| 96 | processor |
| 98 | monitor |
| 100 | input devices |
| 102 | printer |
| 102 | printer |
| 104 | card reader |
| 106 | account database |
| 108 | server |
| 110 | database |
| 112 | server |

What is claimed is:

1. A method for processing a digital image channel which is part of a digital image to compensate for MTF of one or more devices in an imaging chain from capture to printing comprising the steps of:
   (a) providing the MTF of the one or more devices in the imaging chain;
   (b) providing a gain factor, using the MTF to provide an aim response;
   (c) providing a filter from the aim response; and
   (d) applying the filter to the digital image channel to provide a new digital image channel.

2. A method for processing a digital image channel which is part of a digital image to compensate for MTF of one or more devices in an imaging chain from capture to printing comprising the steps of:
   (a) providing the MTF of the one or more devices in the imaging chain;
   (b) providing a gain factor, using the gain factor and the MTF to provide an aim response;
   (c) providing a filter from the aim response; and
   (d) applying the filter to the digital image channel to provide a new digital image channel.

3. The method of claim 2 wherein the gain factor is predetermined.

4. The method of claim 2 wherein the gain factor is determined by the signal to noise ratio in the imaging chain or the dynamic range in the imaging chain or combinations thereof.

5. The method of claim 2 wherein the MTF is that of an output device or image capture device in the imaging chain.

6. The method of claim 2 wherein the filter is a Gaussian filter.

7. A method for processing a digital image channel which is part of a digital image to compensate for MTF of one or more devices in an imaging chain from capture to printing comprising the steps of:
   (a) providing the MTF of the one or more devices in the imaging chain;
   (b) providing a gain factor, using the gain factor and the MTF to provide an aim response;
   (c) providing a filter from the aim response by using a weighted fitting in the frequency domain; and
   (d) applying the filter to the digital image channel to provide a new digital image channel compensated for the MTF.

8. The method of claim 7 wherein the weighted fitting is a weighted least square fitting.

9. The method of claim 7 wherein the weighted fitting is a weighted least square fitting which provides a weighting function that is monotonically decreasing with increasing frequencies.

10. The method of claim 9 wherein the weighting function is a function of the MTF.

11. The method of claim 9 wherein the weighting function is a function of the response of a human visual system.

12. The method of claim 7 wherein the gain factor is predetermined.

13. The method of claim 7 wherein the gain factor is determined by the signal to noise ratio in the imaging chain or the dynamic range in the imaging chain or combinations thereof.

14. The method of claim 7 wherein the MTF is that of an output device or image capture device in the imaging chain.

15. The method of claim 7 wherein the filter is a Gaussian filter.

16. The method of claim 3 wherein the gain and filter are jointly determined.

17. A computer program product having instructions stored thereon for causing a computer to perform the method of claim 1.

18. computer program product having instructions stored thereon for causing a computer to perform the method of claim 2.

19. A method for processing a digital image channel which is part of a digital image to compensate for MTF of one or more devices in an imaging chain from capture to printing and paying for such processed digital image comprising the steps of:
- (a) a user sending a digital image channel via a communication network to a processing site where the digital image channel is to be processed and paying for such processed digital image channel;
- (b) processing such digital image channel by:
  - (i) providing the MTF of the one or more devices in the imaging chain;
  - (ii) providing a gain factor, using the MTF to provide an aim response;
  - (iii) providing a filter from the aim response; and
  - (iv) applying the filter to the digital image channel to provide a new digital image channel; and
- (c) sending the processed digital image channel to a location designated by the user and the user making payment via the communication network for the processed digital image.

20. A method for processing a digital image channel which is part of a digit image to compensate for MTF of one or more devices in an imaging chain from capture to printing and paying for such processed digital image comprising the steps of:
- (a) a user sending a digital image channel via a communication network to a processing site where the digital image channel is to be processed and paying for such processed digital image channel;
- (b) processing such digital image channel by:
  - (i) providing the MTF of the one or more devices in the imaging chain;
  - (ii) providing a gain factor, using the gain factor and the MTF to provide an aim response;
  - (iii) providing a filter from the aim response; and
  - (iv) applying the filter to the digital image channel to provide a new digital image channel; and
- (c) sending the processed digital image channel to a location designated by the user and the user making payment via the communication network for the processed digital image.

* * * * *